US008499283B2

(12) United States Patent
Mony

(10) Patent No.: US 8,499,283 B2
(45) Date of Patent: Jul. 30, 2013

(54) DETECTION OF SCRIPTING-LANGUAGE-BASED EXPLOITS USING PARSE TREE TRANSFORMATION

(75) Inventor: Rajesh Mony, Sunnyvale, CA (US)

(73) Assignee: Webroot Inc., Broomfield, CO (US)

( * ) Notice: Subject to any disclaimer, the term of this patent is extended or adjusted under 35 U.S.C. 154(b) by 365 days.

(21) Appl. No.: 13/010,639

(22) Filed: Jan. 20, 2011

(65) Prior Publication Data

US 2011/0197177 A1    Aug. 11, 2011

Related U.S. Application Data

(63) Continuation-in-part of application No. 12/703,074, filed on Feb. 9, 2010.

(60) Provisional application No. 61/387,420, filed on Sep. 28, 2010.

(51) Int. Cl.
*G06F 9/44* (2006.01)
*G06F 11/00* (2006.01)
*G06F 12/14* (2006.01)

(52) U.S. Cl.
USPC ........... 717/115; 717/100; 717/106; 717/124; 717/126; 726/24; 726/25

(58) Field of Classification Search
None
See application file for complete search history.

(56) References Cited

U.S. PATENT DOCUMENTS

| 7,343,626 | B1 * | 3/2008 | Gallagher | 726/25 |
|---|---|---|---|---|
| 8,307,435 | B1 * | 11/2012 | Mann et al. | 717/124 |
| 2006/0101334 | A1 * | 5/2006 | Liao et al. | 717/115 |
| 2006/0117055 | A1 * | 6/2006 | Doyle | 717/100 |
| 2007/0016953 | A1 | 1/2007 | Morris et al. | |
| 2009/0292791 | A1 * | 11/2009 | Livshits et al. | 717/106 |
| 2010/0043072 | A1 * | 2/2010 | Rothwell | 726/24 |
| 2010/0313183 | A1 * | 12/2010 | Ellen et al. | 717/110 |
| 2011/0138361 | A1 * | 6/2011 | McEntee et al. | 717/125 |
| 2011/0197272 | A1 * | 8/2011 | Mony | 717/115 |
| 2012/0017200 | A1 * | 1/2012 | Ghosh et al. | 717/126 |

FOREIGN PATENT DOCUMENTS

EP    1315066 A1    5/2003

OTHER PUBLICATIONS

Zhendong Su et al., The Essence of Command Injection Attacks in Web Applications, 2006 ACM [Retrieved on Feb. 19, 2013]. Retrieved from the internet: <URL: http://dl.acm.org/citation.cfm?id=1111070> 11 Pages (372-382).*
Toby Clarke, Fuzzing for Software Vulnerability Discovery, Feb. 17, 2009, [Retrieved on Feb. 19, 2013]. Retrieved from the internet: <URL: http://www.sm0k.org/repository/fuzzing/Fuzzing_for_software_vulnerability_discovery.pdf> 178 Pages (1-178).*

(Continued)

*Primary Examiner* — don wong
*Assistant Examiner* — Anibal Rivera
(74) *Attorney, Agent, or Firm* — Sheridan Ross P.C.

(57) ABSTRACT

Systems and methods for protecting client computers are described. One exemplary system includes an initial filter that gathers scripting-language-data from webpage data and a signature database of signatures of known scripting-language-data exploits. In addition, a parser generates a parse tree from the scripting-language-data, and a normalization and signature matching component reduces a complexity of the parse tree, generates a representation of at least a portion of a structure of the parse tree, and prevents the scripting-language-data from reaching an intended recipient if the representation matches one of the signatures of known scripting-language-data exploits.

20 Claims, 15 Drawing Sheets

OTHER PUBLICATIONS

Morris, et al., "Specification for related U.S. Appl. No. 13/372,375," filed Feb. 13, 2012, p. 56 to be published in: US.
Morris, et al., "Specification for related U.S. Appl. No. 13/372,433," filed Feb. 13, 2012, p. 58 to be published in: US.
Morris, et al., "Specification for related U.S. Appl. No. 13/372,439," filed Feb. 13, 2012, p. 54 to be published in: US.
Sogno-Pabis, Elzbieta, "Partial International Search Report re application PCT/EP2012/052497", May 4, 2012, p. 7 Published in: NL.

* cited by examiner

Parser variable name analysis :

Activex Create Object analysis :

Hidden Iframe analysis :

Recursive Script :

Script Execution Error Analysis :

Unescape Input analysis :

DETECTION OF SCRIPTING-LANGUAGE-BASED EXPLOITS USING PARSE TREE TRANSFORMATION

PRIORITY

This application is a continuation-in-part of U.S. patent application Ser. No. 12/703,074 entitled Low-Latency Detection of Scripting-Language-Based Exploits, which is incorporated herein in its entirety. In addition, this application claims priority to U.S. provisional application No. 61/387,420 entitled Detection of Scripting-Language-Based Exploits Using Parse Tree Transformation, which is also incorporated herein in its entirety.

FIELD OF THE INVENTION

The present invention relates to computer system protection technologies. In particular, but not by way of limitation, the present invention relates to systems and methods for controlling pestware or malware.

BACKGROUND OF THE INVENTION

Personal computers and business computers are continually attacked by trojans, spyware, and adware, collectively referred to as "malware" or "pestware." These types of programs may act simply to destroy information or to gather information about a person or organization—often without the person or organization's knowledge. Some malware is highly malicious. Other malware is non-malicious but may cause issues with privacy or system performance.

Malware is often initiated or distributed in the form of a scripting language such as ECMAscript-based scripting languages (e.g., JavaScript or Flash). For example, attackers are known to cause a target web site, which may be a well-known and generally trusted web site (e.g., banking web site, national news web site, etc.) to include a malicious script in one or more webpages of the target site. These embedded scripts may then be automatically initiated and executed to exploit one or more aspects of a user's web browser or operating system when a user accesses the targeted webpage.

Products are available to detect some malware scripts, but many scripts are encoded and/or dynamically morph so as to be difficult to identify as malware. And known techniques, if effective at all, for detecting malicious or suspect scripts are slow, and as a consequence, not suitable to offer as a proxy-based implementation.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Embodiments of the present invention include methods, computer-readable mediums, and systems for protecting client computers from malware. In one embodiment for example, the invention may be characterized as a method for protecting client computers. The method may include receiving webpage data at a proxy from a webpage before the data reaches an intended recipient, the proxy is disposed as an intermediary between a server serving up the webpage and the intended recipient; gathering scripting-language-data from the webpage data; generating a parse tree from the gathered scripting-language-data; normalizing string-splitting constructs to reduce a level of string splitting in the parse tree; replacing variable names of the parse tree with standard names; generating a representation of at least a portion of the standard names; comparing the representation with signatures of known scripting language exploits; and preventing the scripting-language-data from reaching the intended recipient if the representation matches a signature of the one of the known scripting language exploits.

In another embodiment, the invention may be characterized as system for protecting client computers. The system in this embodiment includes an initial filter that gathers scripting-language-data from webpage data; a signature database of signatures of known scripting-language-data exploits; a parser that generates a parse tree from the scripting-language-data; and a normalization and signature matching component that reduces a complexity of the parse tree, generates a representation of at least a portion of a structure of the parse tree, and prevents the scripting-language-data from reaching an intended recipient if the representation matches one of the signatures of known scripting-language-data exploits.

This and other embodiments are described in more detail herein.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
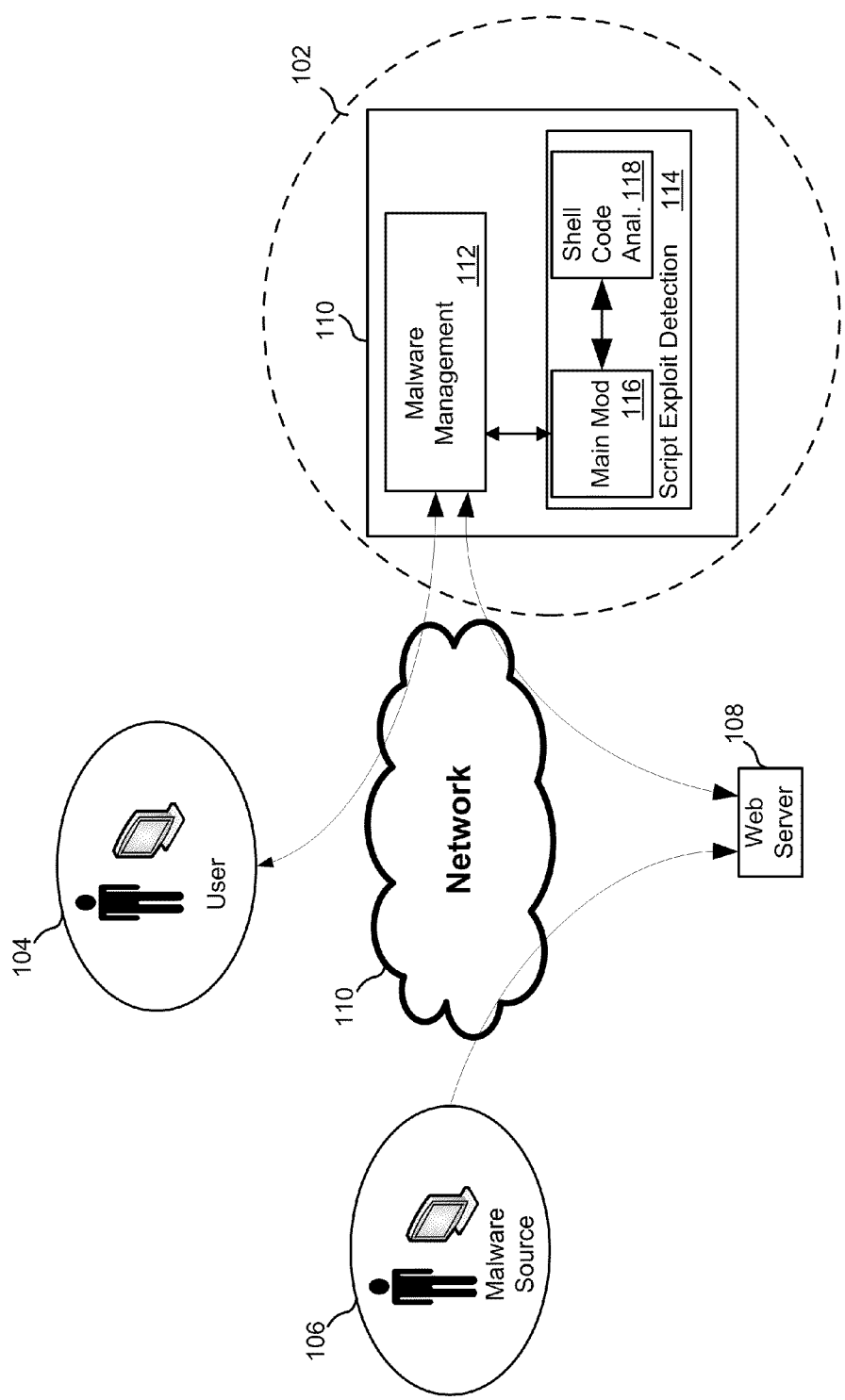
FIG. 1 is a block diagram depicting an environment in which several embodiments of the invention may be implemented.

Referring now to the drawings, where like or similar elements are designated with identical reference numerals throughout the several views, and referring in particular to FIG. 1, it is a block diagram depicting an environment in which several embodiments of the invention may be implemented. As shown, a security center 102, remote user 104, a malware source 106, and a web server 108 are all communicatively coupled through a network (e.g., the Internet and/or local or wide area networks) 110. Although only one remote user 104, malware source 106, web server 108, and security center 102 are depicted, each of these logically represents a potentially unlimited number of persons or entities.

In the depicted environment, the malware source 106 generally represents a source of malware that ends up located at the web server 108, which may or may not be suspected of hosting malware. For example, the malware source 106 may generate malware in the form of a scripting language such as ECMAscript-based scripting languages (e.g., JavaScript or Adobe Flash). And the malware source 106 may cause (e.g., by using SQL injection) the web server 108, which may be a well-known and generally trusted web site (e.g., banking web site, national news web site, etc.) to include a malicious script in one or more of its web pages. These embedded scripts may then be automatically initiated and executed to exploit one or more aspects of the user's 104 web browser and/or operating system when the user 104 accesses the web server.

As depicted, the security center 102 is disposed and configured as a proxy to be interposed in a communication path between the user 104 and the web server 108 so that the user 104 may request content from the web server 108, but before any content is provided to the user 104, the security center 102 manages the content that is provided to the user 104. In many implementations, the security center 102 operates according to a software as a service (SaaS) business model to generally provide proactive Web security to block threats "in the cloud" before the threats reach the user 104.

As depicted in FIG. 1, the exemplary security center 102 includes a threat protection component 110 that includes a malware management portion 112 that is coupled to a script exploit detector 114 that includes a main module 116 and a shellcode analysis module 118. Although not depicted, the security center 102 may also include components that provide other services (e.g., internet policy enforcement, in/outbound content control, application control and compliance-related services).

The threat protection component 110 is generally configured to stop known and unknown virus, phishing and malware attacks before they reach the remote user. More specifically, the threat protection component 110 includes a malware management component 112 that may include both antivirus and anti-spyware components. The malware management component 112 may for example, utilize malware-signature-based techniques to identify spyware and/or viruses and pass along data that may include scripting-language-based exploits to the script exploit detection component 114, which is generally configured to assess, in near real-time, whether the content that is communicated to the user 104 includes scripting-language-based exploits (e.g., JavaScript-based or Flash-based exploits).

More specifically, the malware management component 112 passes along data to the main module 116 within the script exploit detector 114, which is generally configured to quickly determine whether the data should be blocked from the user 104 on the basis that the data is a malicious scripting language object (e.g., an encoded JavaScript). Actual implementations for example, may process traffic in about 100 ms so that a user experiences little or no perceptible latency as compared to the time it would take traffic to be directly routed from the web server 108 to the user 104.

The main module 116 is configured so that initially quick techniques are used to assess whether the data should be blocked, and then successively utilize, if required, more and more rigorous and time-intensive techniques to arrive at a determination as to whether or not to block the data from the user. In this way, the main module 116 (and script detector 114 generally) is able to more quickly assess whether the data includes a threat (e.g., an encoded scripting-language-based exploit).

As depicted, the main module 116 in the exemplary embodiment is coupled to the shellcode analysis module 118, and if less time intensive techniques (discussed further herein) do not provide a reasonable indication as to whether the data should be blocked (or not) from the user 104, the main module 116 passes data to the shellcode analysis module 118 for additional analysis.

The shellcode analysis module 118 is generally configured to analyze data for indicia of shellcode (e.g., shellcode-type patterns). In many implementations, the shell code analysis module 118 in connection with the main module 116 is also configured to successively carryout more intensive (e.g., more time intensive) operations until a determination may be made that the data includes (or is intended to spawn) shell code. As a consequence, the shellcode analysis module 118 in these implementations is able to more quickly assess whether the data includes shellcode by effectuating time intensive techniques once one or more less-time-intensive-techniques have been attempted.

It should be recognized that the illustrated arrangement of components in FIG. 1 is logical, and is not meant to be an actual hardware diagram. Thus, many of the components can be combined and/or further separated in an actual implementation. For example, the script exploit detector 114 may be closely integrated with the malware management component 112. Moreover, the construction of each individual component in light of this disclosure will be well-known to those of skill in the art.

Figure 2:
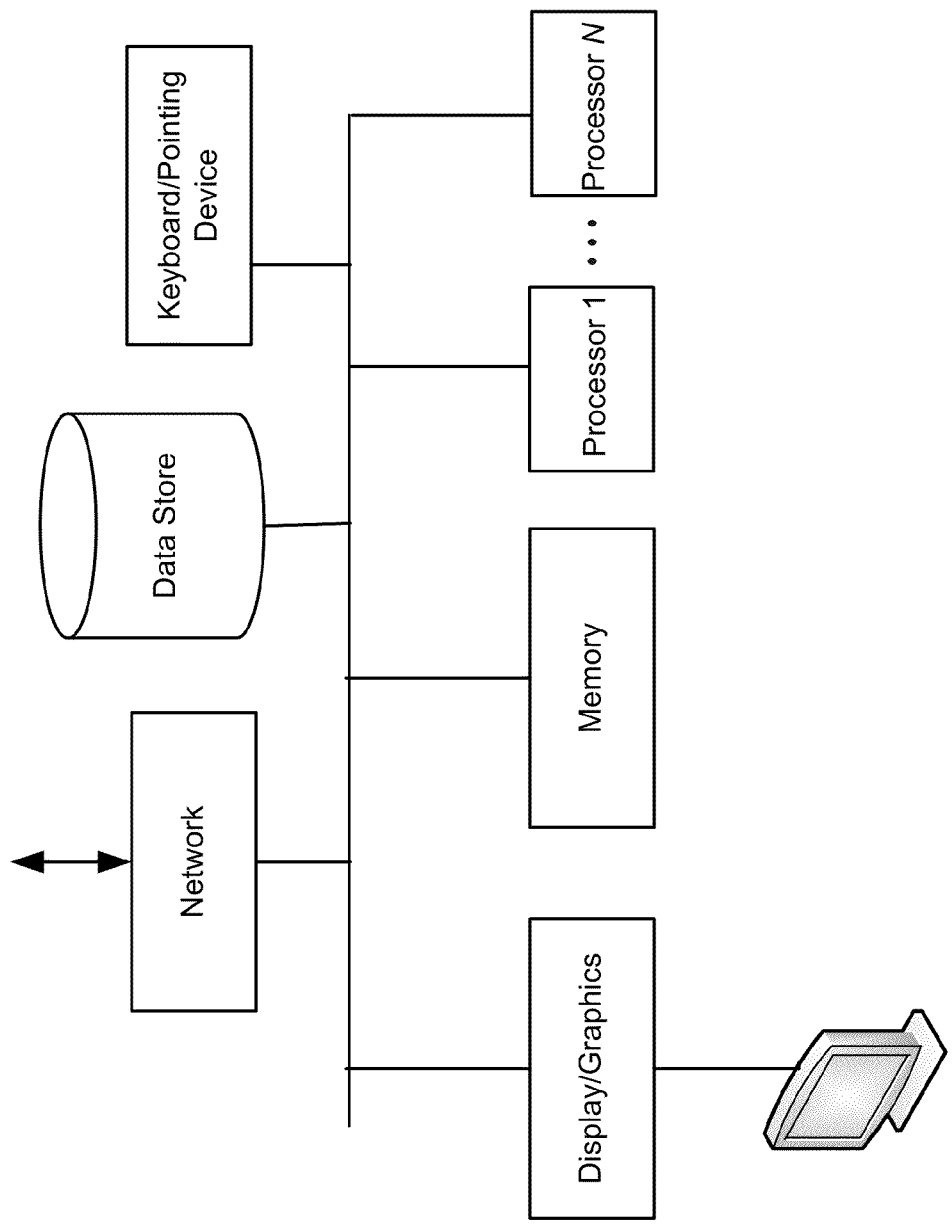
FIG. 2 is a block diagram depicting exemplary components of the threat protection component described with reference to FIG. 1.

Referring next to FIG. 2, shown is a block diagram depicting hardware components underlying an exemplary embodiment of the threat protection component 110 described with reference to FIG. 1. As shown, N processors in this embodiment (e.g., one or more processors) are coupled to a bus, and also coupled to the bus are a memory, a data store, a keyboard/pointing device, a display/graphics adapter, and a network interface. In addition, a display is coupled to the display/graphics adapter.

The data store may be any device capable of holding substantial amounts (e.g., 300-400 GB) of data, such as a hard drive, flash memory, compact disk read-only memory (CD-ROM), DVD, or some other form of fixed or removable storage device. And the data store in this embodiment stores processor-readable code with instructions to effectuate the functions described herein (e.g., the functions of the malware management component 112 and the script exploit detector 114). The processors generally function to execute code and process other information that resides in memory, and may be any specific or general-purpose processor such as an INTEL x86 or POWERPC-compatible central processing unit (CPU), and may include multiple (e.g., four) cores. The memory may be 8 GB of random access memory, but this is merely exemplary and other memory types and sizes may be utilized. As one of ordinarily skill will appreciate, an operating system (e.g., LINUX or WINDOWS) may also reside in the data store and memory and function (e.g., when executed by the processor) to enable the threat protection component 110 to interoperate with the components depicted in FIG. 1.

As one of ordinary skill in the art in light of this disclosure will appreciate, FIG. 2 depicts only an exemplary embodiment, and in other embodiments, the threat protection component 110 may be realized by instructions embodied in firmware, application-specific integrated circuits (ASICs), and/or programmable logic devices.

Figure 3:
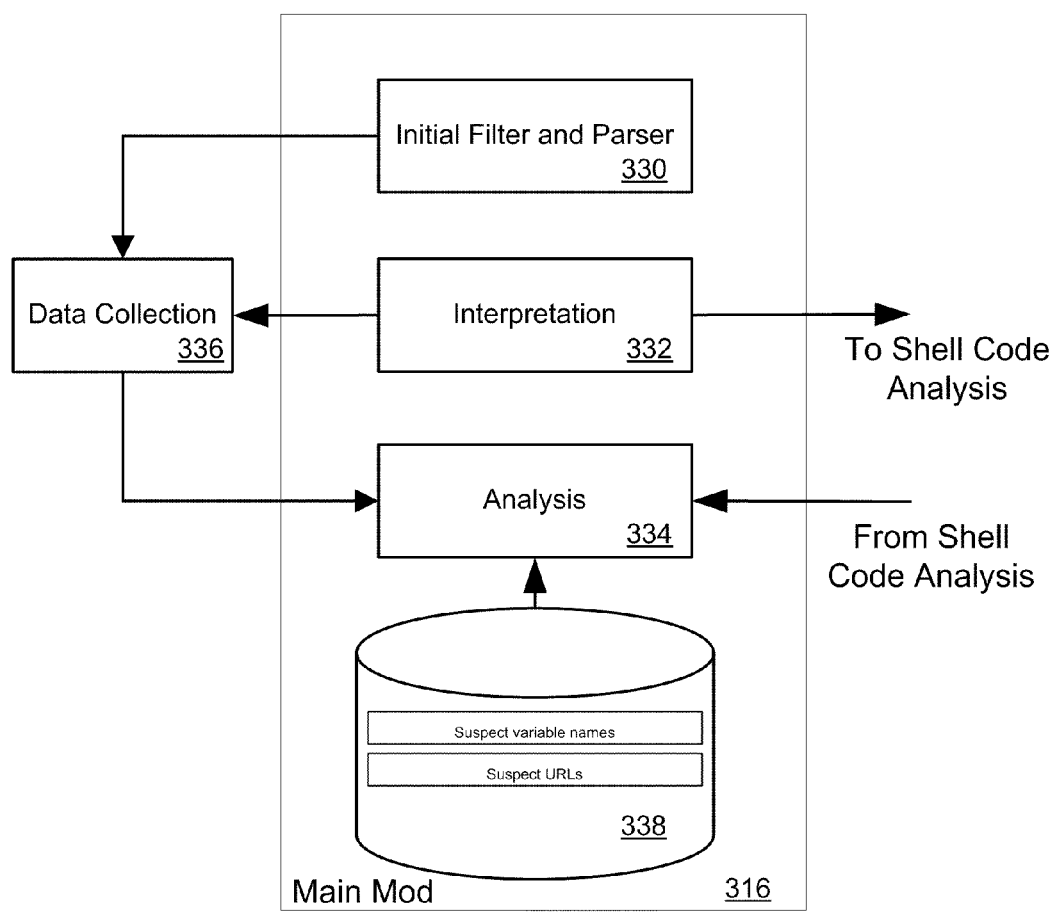
FIG. 3 is a block diagram depicting an exemplary embodiment of the main module of the threat protection portion described with reference to FIG. 1.

Referring next to FIG. 3, it is a block diagram depicting an exemplary embodiment of the main module 216 of the threat protection portion 110 described with reference to FIG. 1. As shown, the main module 316 in this embodiment includes an initial filter and parser component 330, an interpretation component 332, an analysis component 334, and a data collection component 336. Again, the illustrated arrangement of components in FIG. 3 is logical, it is not meant to be an actual hardware diagram. Thus, the components may interoperate in a more integrated, cohesive manner or may operate as discrete elements, and portions of these components may be realized by common subcomponents and may be further separated in an actual implementation.

The initial filter and parser component 330 generally functions to quickly process the data that it receives (e.g., data that is organized according to hypertext markup language (HTML)) and assess, without executing code (and without emulating execution) within the data, whether the data includes indicia of a scripting-language exploit, and if not, the data is provided back to the malware management component 112 for further processing or to be sent to the user 104.

As discussed further herein, the initial filter and parser component 330, in connection with the analysis component 334, is configured to utilize, on an as needed basis (e.g., as needed to reasonably predict whether the data is (or is not) scripting-language-based), successively more rigorous and time intensive heuristic techniques to analyze the data for scripting-language-based exploits. For example, in some implementations, the initial filter and parser component 330 initially assesses whether the data includes (or excludes) suspect language attributes that are associated with scripting-based languages.

If the data does not include attributes that are typically present in scripting-language data, the data is passed back to the malware management module 112. Otherwise, the data that includes suspect scripting-language attributes is further consolidated, and parsed into a form that may be further heuristically analyzed, and the initial filter and parser 330 provides analysis-data to the data collection component 336 to be further analyzed as discussed further herein. As a consequence, only a portion of the data (e.g., data that can not reasonably be ruled out as being non-scripting-language-based) is further analyzed so that from a user perspective, the data is on average, processed more quickly.

The interpretation component 332 is generally configured to emulate execution of any data that is suspected of being scripting-language-based. In many implementations for example, the interpretation component 332 emulates the creation of a document object model (DOM) using substantially real time data (e.g., substantially real time values extracted from hypertext transfer protocol (HTTP) parameters) so as to provide a source of inspection data, which may be stored in the data collection component 336 and analyzed by the analysis portion 334 for suspect patterns (e.g., attempts to access several objects in the same script, attempts to obtain administrator status, hidden Iframes, recursive scripts, etc.

And many variations of the interpretation module 332 include an engine that is adapted to emulate execution of the code and provide inspection points that provide the inspection data, which may also be stored in the data collection component 336 for analysis. In addition, if the strings of code suggest that the code may be shellcode, the interpretation component 332 (and/or the initial filter and parser 330) provides the code to the shellcode analysis module 118 for analysis to determine whether the code includes indicia of shellcode. In some implementations for example, if a string exceeds a size threshold (e.g., 50 Bytes), the interpretation component 332 provides the string to the shellcode analysis module 118 for additional analysis.

The analysis component 334 depicted in FIG. 3 is generally configured to heuristically analyze data that is gathered by the initial filter and parser component 330, the interpretation component 332, and the shellcode module 334 to make a determination whether to block the content from reaching a user (e.g., user 104). And as shown, the analysis component 334 is also coupled to a data store 338, which includes a list of suspect variable names and a list of suspect URLs. As discussed further herein, the variable names in the data and the URL of the web server (e.g., web server 108) may be analyzed, (e.g., using a heuristic scoring analysis) in connection with analysis-data from the initial filter and parser component 330, inspection data from the interpretation component 332, and feedback from the shellcode module 334.

Figure 4:
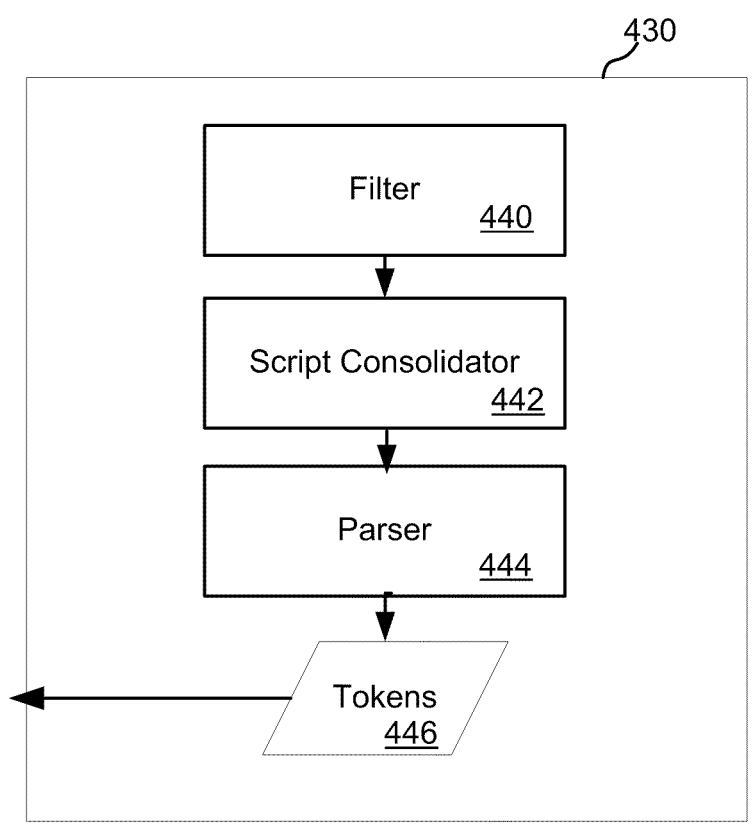
FIG. 4 is a block diagram depicting an exemplary embodiment of the initial filter and parser component described with reference to FIG. 3.

Referring next to FIG. 4, shown is an exemplary embodiment of the initial filter and parser component 330 described with reference to FIG. 3. As depicted, the initial filter and parser component 430 in this embodiment includes a filter 440, a script consolidator 442, and a parser 444 that provide tokens 446 for further assessment by the analysis portion 334 described with reference to FIG. 3.

The filter 440 in this embodiment is generally configured to receive data from the malware management component 112 described with reference to FIG. 1, and filter the data for content that includes indicia of scripting-language-based data while passing back data to the malware management component 112 that does not appear to be scripting-language based. In many implementations for example, the filter 440 utilizes language heuristics to quickly assess whether language attributes of the data it receives are indicative of scripting-language-based content, and if not, the data is passed back to the malware management component 112. In many implementations for example, suspect language attributes include the presence of Eval functions, a number of statements exceeding a threshold, the existence of a DOM object, long strings (e.g., greater than 50 bytes), long arrays (e.g., greater than 64), unicode-encoded or hex encoded data, document-writes, and Create Object functions.

The data that is not passed back to the malware management component 112 (e.g., data that includes indicia of scripting-language-based content) is then received by the script consolidator 442, which generally functions to consolidate separate script portions to form an inspection block. For example, script portions are gathered by traversing HTML-based data (including elements beyond the last HTML tag) and extracting the portions that appear to be organized according to a scripting language.

The consolidated inspection block is then received by the parser 444, which generally operates to generate normalized token objects from the inspection block. In many embodiments, the parser 444 generates the tokens without executing the inspection block so as to avoid the processing and time intensive aspects of executing code. As depicted, the normalized token objects 446 are then collected (e.g., in the data collection component 336) for analysis (e.g., by the analysis portion 334).

Thus, in many implementations, the initial filter and parser 430 successively carries out more intensive analysis (e.g., initially filtering out data using language-based heuristics, and then consolidating, parsing, and analyzing parsed data that is not filtered) so that only suspect data continues to be analyzed.

Figure 5:
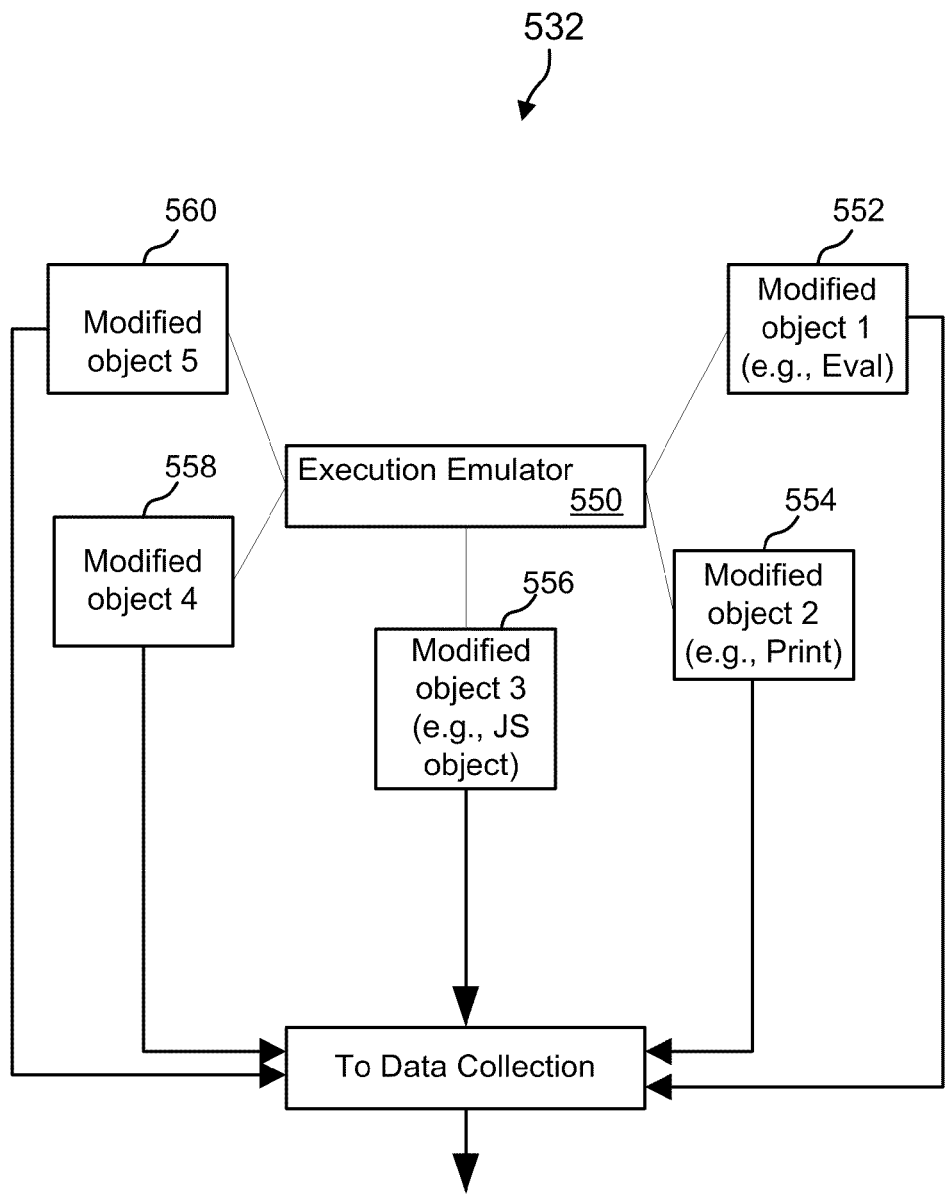
FIG. 5 is a block diagram of an exemplary embodiment of the interpretation module depicted in FIG. 3.

Referring next to FIG. 5, shown is an exemplary embodiment of the interpretation module 332 depicted in FIG. 3. As shown, the interpretation module 532 in this embodiment includes an execution emulator 550 that generally functions to emulate the execution of scripting-language-data (e.g., in a best effort manner) so that, without executing the scripting-language-data, the scripting-language-data is processed in much the same way a web browser would process the scripting-language-data.

In many embodiments, the execution emulator 550 is realized by a modified scripting-language execution engine so that the modified engine provides the depicted modified objects 552, 554, 556, 558, 560 that enable inspection data to be collected, which indicates what functions that the scripting-language-data would carry out if the engine were unmodified (e.g., if the engine was part of a user's web browser). In one embodiment, the execution emulator 550 is realized by modifying a JavaScript engine (e.g., a Mozilla JavaScript engine) so that the engine provides emulated DOM objects The DOM objects may include, for example, Eval, Iframe, document, window, navigator, screen classes etc., and their properties and functions are emulated with real data from the malware management component 112. In addition, several scripting-language functions (e.g., Eval, Print etc.) are also modified to inspect data.

In operation, the execution emulator 550 receives substantially real time data (e.g., values of parameters obtained from HTTP data) from the malware management component 112, and the execution emulator 550 generates an emulated DOM (depicted as the modified objects) from the real time data received. The modified DOM objects enable control over the scripting-language data to be maintained while collecting the inspection data from the DOM objects.

In many embodiments, the emulated DOM provides data that is collected to form a data tree that is provided to the data collection component 336 described with reference to FIG. 3. And in many variations of these embodiments, errors are suppressed by tracking variables at every branch point until the scope is lost on a variable, and once the scope is lost, then that point in time is used as an inspection point to capture as much data as possible.

As shown, the execution emulator 550 emulates a DOM by providing DOM objects that are configured to provide inspection points for data that may be analyzed for indicia of malware. In addition, the modified objects 552, 554, 556, 558, 560 in many implementations include script objects (e.g., JavaScript). Once the data from the emulated DOM is obtained, it is then analyzed (e.g., by the analysis component 334).

Figure 6:
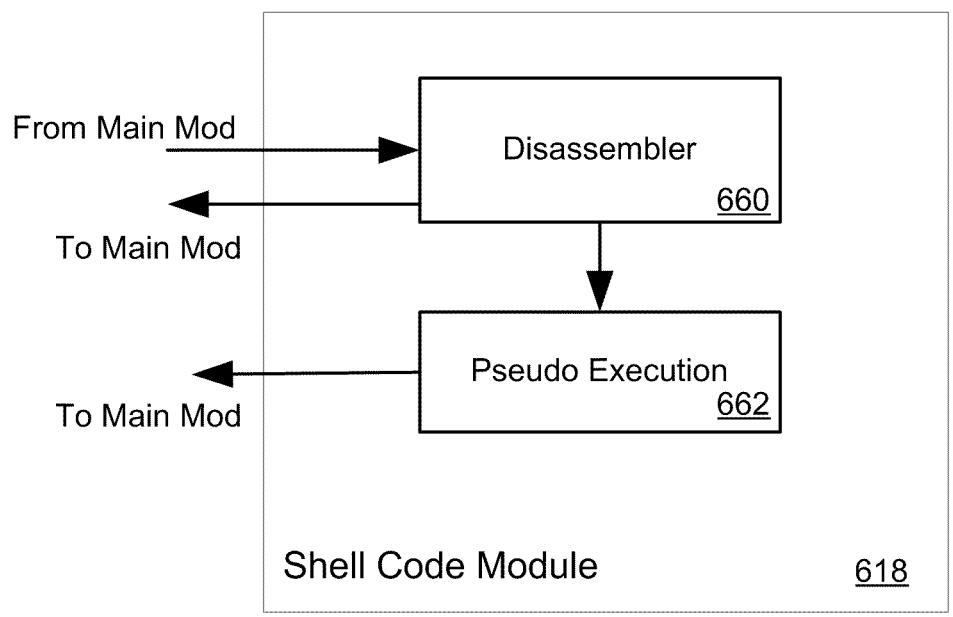
FIG. 6 is a block diagram of an exemplary embodiment of the shellcode analysis module depicted in FIG. 1.

Referring next to FIG. 6, shown is an exemplary embodiment of the shell code analysis module 118 described with reference to FIG. 1. As shown, in this embodiment the shellcode module 618 includes a disassembler 660 disposed to receive a string of data (e.g., from the main module 116, 316) and a pseudo execution component 662. Again, the depicted components are logical and may be combined or further separated when realized by hardware, software, firmware or a combination thereof.

In general, the shellcode module 618 processes a string of code to provide data that enables an assessment to be made as to whether the string of code exhibits indicia of shellcode (e.g., code that would provide access, from a remote location, to operating system services or kernel services at the user's 104 computer). For example, shellcode often operates to instruct an infected machine to download an executable file from a webpage and then execute the file to install software on the infected machine. The shellcode module 618 in many implementations is configured to identify events (while analyzing the code) that are consistent with attempts to down load an executable file from a webpage.

Shellcode may exist in a variety of forms including plain shellcode and shellcode that is encoded, and the techniques that are utilized within the shellcode to make detection difficult include the use of indirect instructions. To reside inside certain types of languages, shellcode may be ASCII, upper case, and may be Unicode-encoded so that the shellcode looks like normal data. Although a static analysis may be effective when applied to the plain shellcode, static analysis of encoded shellcode is generally ineffective.

The challenge in doing a static analysis is that it is very difficult to identify encoded shellcode because there are typically no discernible patterns that can be definitively associated with shellcode, so it is difficult to identify shellcode without actually executing the code. In addition, self-modifying shellcode (e.g., shellcode that modifies itself on the fly during execution) renders it difficult to analyze the code using static-based techniques.

In many implementations, the shellcode module 618 is engaged by the main module 116 when a string of code is suspected of including shellcode. In some embodiments for example, a string is identified as being a shellcode-suspect when the length of the string exceeds a threshold (e.g., 256 Bytes or 128 Bytes for Unicode-encoded data and hex-encoded data). It should be recognized that this threshold is merely exemplary and other string-size thresholds may be utilized as well.

In many modes of operation, encoded and or self-modifying shellcode may be identified without actually executing the code. For example, the code may be initially disassembled by the disassembler 660 so that the disassembled string may be analyzed (e.g., by the analysis portion 334 described with reference to FIG. 3) to assess whether patterns indicative of shellcode exist in the disassembled code.

Disassembly in many implementations is carried out by the disassembler 660 in a different manner than ordinary disassembly because the starting point of the code may be unknown. In some embodiments for example, every byte is disassembled, and a starting seed is searched for. For example, an OR loop may be looked for or a GETPC statement may be searched for, and the main seed is where the disassembler begins disassembly. In addition, suspect regions are identified by looking for core seeds, and once a core seed is found, then a secondary seed is searched for (e.g., by looking backwards and forward in code) and the secondary seed is checked to see if it is valid (e.g., a determination is made whether execution from secondary seed leads to convergence at the primary seed). These validated sections of code are determined to be suspect regions.

The pseudo execution component 662 then carries out pseudo execution on the suspect regions. In many modes of operation, as opposed to typical execution techniques, which track all the registers and process every instruction, many instructions are skipped by the pseudo execution component 662 and only a few (more relevant) instructions are searched for, and only those instructions are processed. Beneficially, the present approach does not utilize past approaches that employ an interpreter that actually executes the code.

Figure 7:
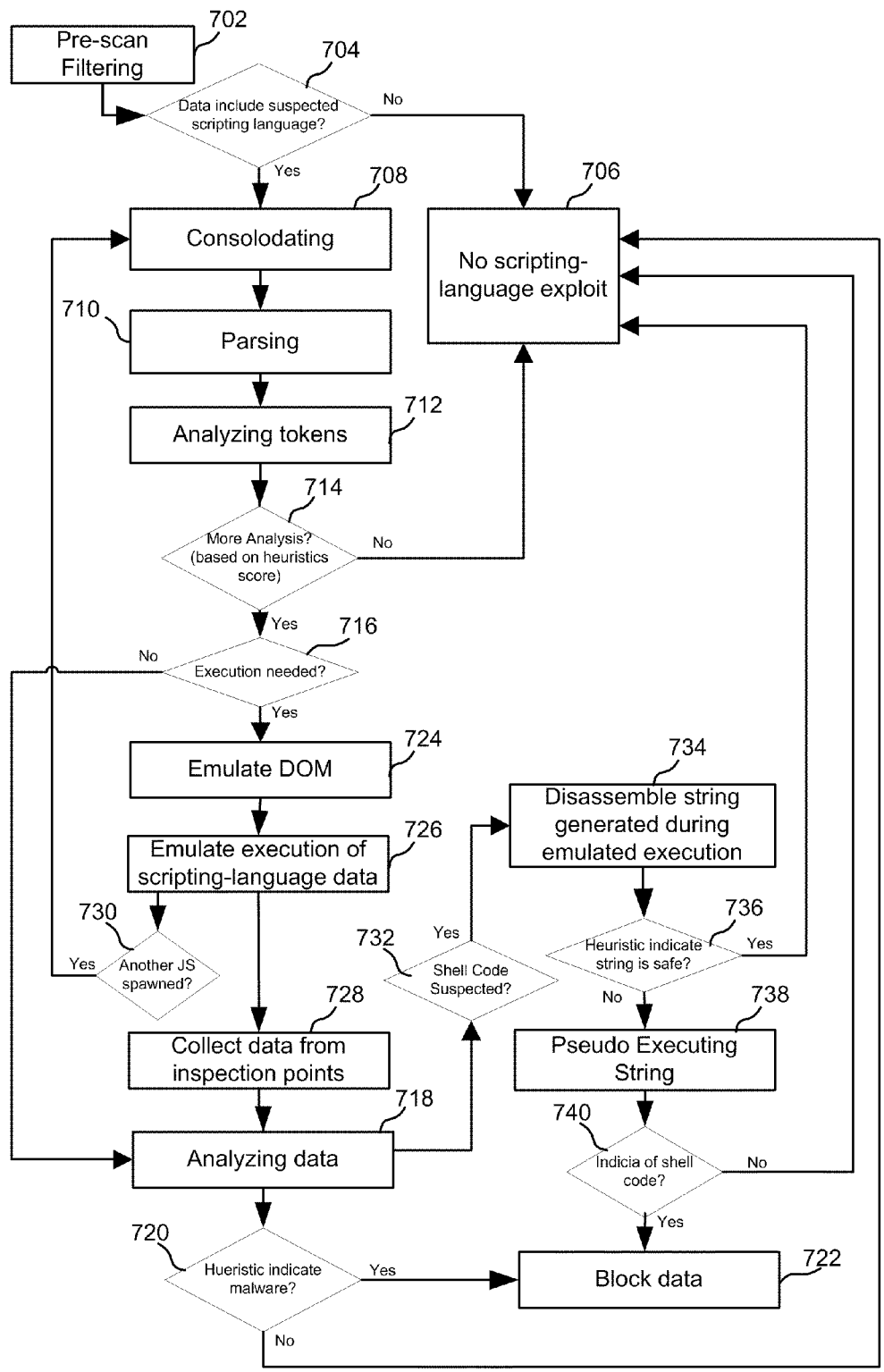
FIG. 7 is a flowchart depicting steps of a method that are traversed in connection with some embodiments of the present invention.

Referring next to FIG. 7, it is a flowchart depicting an exemplary method that may be carried out by one or more of the embodiments described with reference to FIGS. 1-6. As shown, pre-scan filtering (e.g., by the filter 440) is initially carried out (Block 702) on the data that is to be analyzed (e.g., data that may include HTML, scripts, and unknown data) to quickly assess whether the data includes attributes that are indicative of scripting language (Block 704), and if the data does not include attributes of scripting language (Block 704), the data is passed back (e.g., to the malware management component 112 for further analysis or is allowed to pass to a user) (Block 706).

If the data includes suspicious attributes (e.g., attributes indicative of scripting language) (Block 704), then the portions of the data that include indicia of scripting-language data are then consolidated (Block 708) (e.g., by the script consolidator 442) so that separate portions of the data that potentially include scripting-language data are extracted (e.g., extracted from HTML—including portions beyond the last HTML tag) and consolidated to form a collection of suspicious data that is more amenable to analysis.

As shown, the consolidated data is then parsed (e.g., by the parser 444) so that the consolidated data is normalized into tokens (e.g., tokens 446) (Block 710). As discussed, in many modes of operation, the parsing is carried out without executing the data so as to enable rapid analysis of the tokens (e.g., by the analysis portion 334) (Block 712). And if the consolidated data does not include attributes that indicate the data is suspicious (Block 714), then an indication that the data does not include scripting-language data is provided (e.g., to the malware management component 112) (Block 706). If further analysis of the data is required (Block 714), and pseudo-execution of the data is not required (Block 716), then the normalized data may be analyzed (e.g., by the analysis portion 334) (Block 718) to determine whether the content of the normalized data indicates that the data should blocked from the user (Blocks 720, 722).

If pseudo-execution of the data is desirable (Block 716), then DOM objects are provided to emulate a DOM (Block 724) and an emulated execution of the data is carried out (Block 726), and inspection data is collected during the emulated execution (Block 728), for analysis (e.g., by the analysis portion 334) (Block 718). As depicted, if another script is spawned during the emulated execution (Block 730), then the spawned script is then put though the steps described above beginning with the consolidation process (Block 708).

In addition, if the data is suspected of including shellcode (Block 732), then additional steps are carried out to provide additional data for analysis. For example, in some embodiments, if the data includes one or more strings that exceed a size threshold (e.g., 50 Bytes), then the data is analyzed for indicia of shellcode attributes (e.g., by the shellcode module 118, 618). As depicted, if the data is not analyzed for shellcode attributes, the results of the analysis of the normalized data (e.g., from the initial filter and parser 330, 430) and/or the inspection data (e.g., from the interpretation module 332, 532) are collected (e.g., in the data collection component 336) and analyzed (e.g., by the analysis portion 334) (Block 718). As discussed further herein, in many embodiments, a heuristic analysis is carried out in which a set of rule checks is applied to obtain a score, and based upon the score, the data is either blocked (Block 722) or an indication that the data does not include malicious scripting language is provided (Block 706).

As depicted, if the one or more strings are suspected of including shellcode (Block 732), the string is disassembled (e.g., by disassembler 660) (Block 734) and heuristically analyzed (e.g., by the analysis portion 334) to assess whether the disassembled string is safe (Block 736), and if it is safe, then an indication that the data does not include malicious scripting language is provided (e.g., to the malware management component 112) (Block 706). But if an examination of the disassembled code indicates that further analysis is needed (Block 736), the a pseudo execution of the string is carried out (e.g., by pseudo execution component 662) (Block 738), and pseudo execution of the data is analyzed to determine whether the string includes indicia of shell code (Block 740), and if so, the data is blocked (Block 722), and if not, an indication that the data does not include scripting language data is provided (Block 706).

In many embodiments, the analysis of the data described with reference with FIG. 7 includes a heuristic scoring analysis that includes two types of matches: a gene-1 list (that only requires one match to determine the data should be blocked); and a gene-2 list that requires two matches before a determination is made to block the code.

Figure 8A:
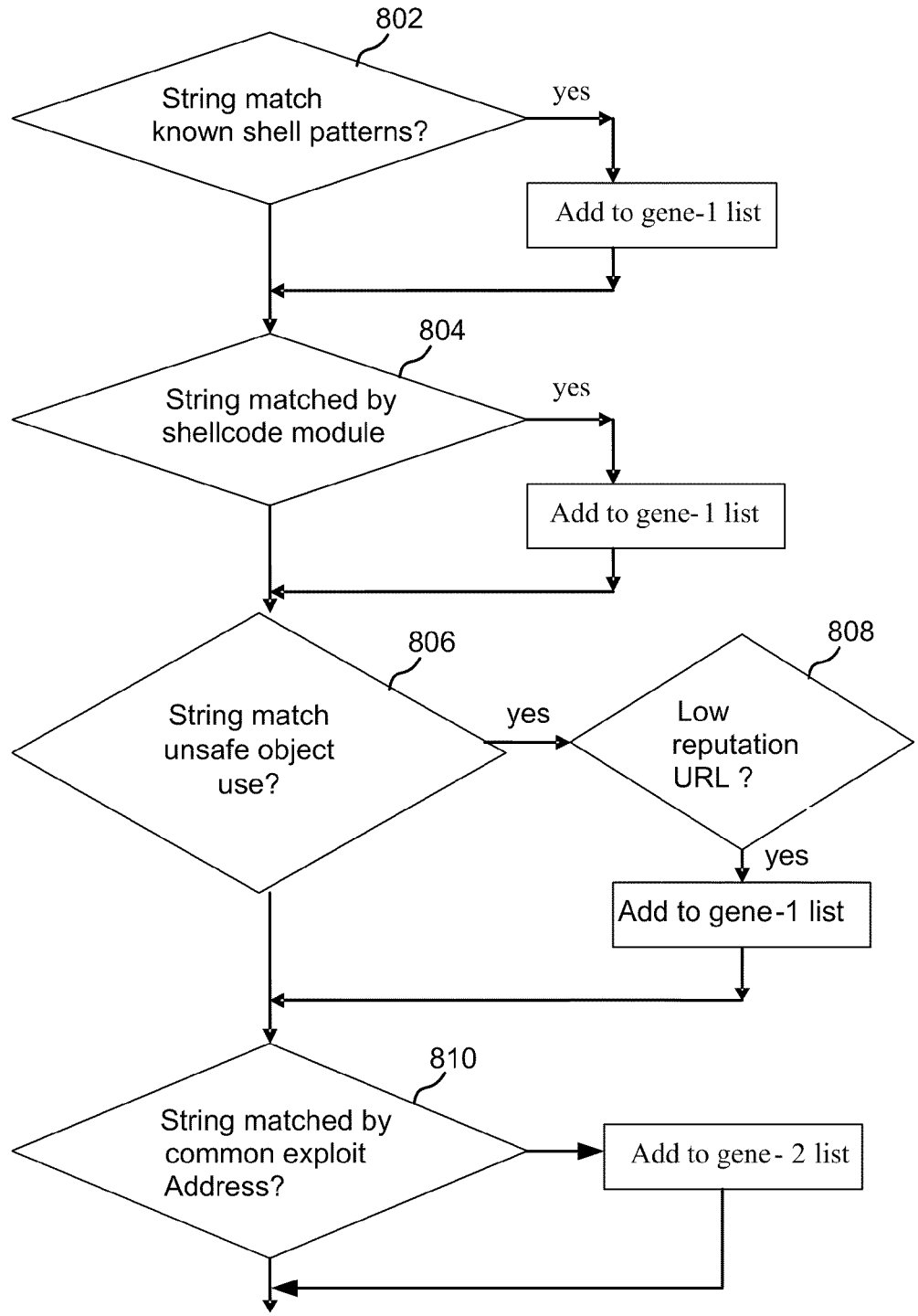
FIG. 8A-8F are flowcharts depicting rule checks traversed in connection with a scoring analysis.

FIGS. 8A-8G depict steps traversed in connection with an exemplary scoring analysis. Referring to FIG. 8A, shown are steps associated with an analysis of a string of code (e.g., after being consolidated by the script consolidator 442 and normalized by the parser 444). As shown, if the string matches known shell patterns (Block 802) then an indication of a match is added to the gene-1 list. In addition, if the shellcode module 118, 618 provides an indication that the string includes shellcode (Block 804), an indication of a match is added to the gene-1 list. And if the string is associated with unsafe object use (Block 806) (e.g., file system access or wrshell use) and the URL that is the source of the string is associated with malicious exploits (Block 808) (e.g., the URL is in the list of suspect URLs in the data store 338), a match is added to the gene-1 list. If the string initializes a memory address that is known to be associated with exploits (e.g., 0x0c0c0c0c), then a match is indicated in the gene-2 list.

Figure 8B:
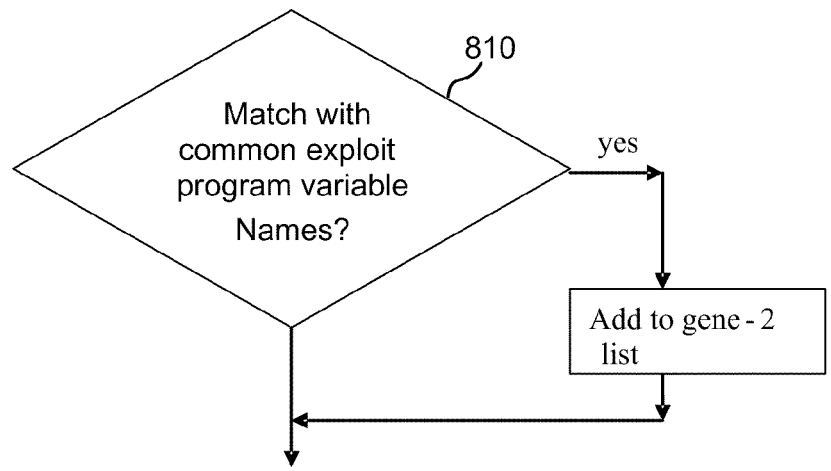

As depicted in FIG. 8B, if there is a match between a variable name in the data that is being analyzed and a list of variable names that are associated with exploits (Block 810) (e.g., variable names stored in the datastore 338), then an indication of a match is added to the gene-2 list.

Figure 8C:
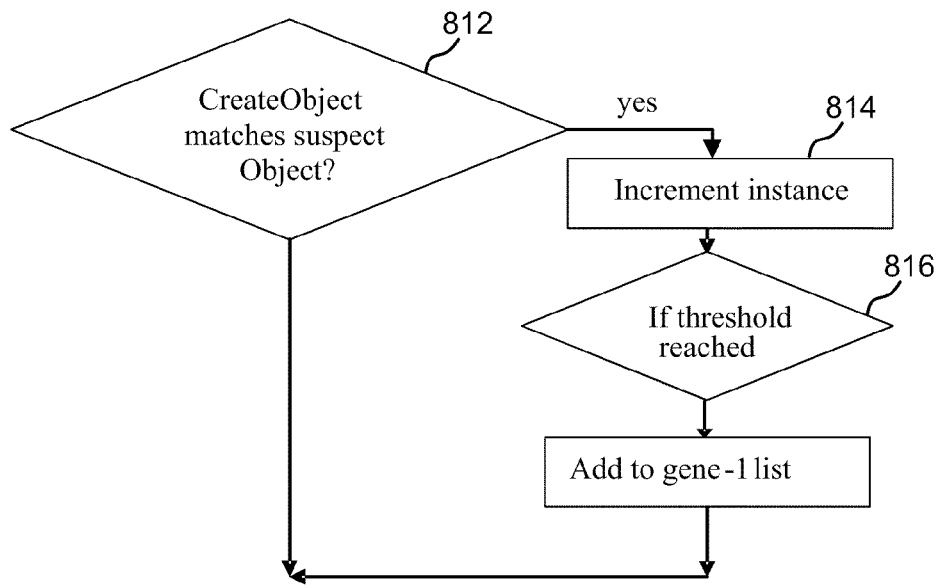

Referring to FIG. 8C, shown are steps traversed in connection with an ActiveX-CreateObject-analysis. As, shown if CreateObject matches a suspect object (Block 812), then a counter is incremented (Block 814), and if a threshold is reached (Block 816) (e.g., one instances of an object), then an indication of a match is added to the gene-1 list, but if the threshold is not reached (Block 816), then Blocks 812 and 814 are repeated. In many embodiments, the interpretation module 332, 532 provides inspection data that is used (e.g., by the analysis component 334) to assess whether CreateObject matches a suspect object.

Figure 8D:
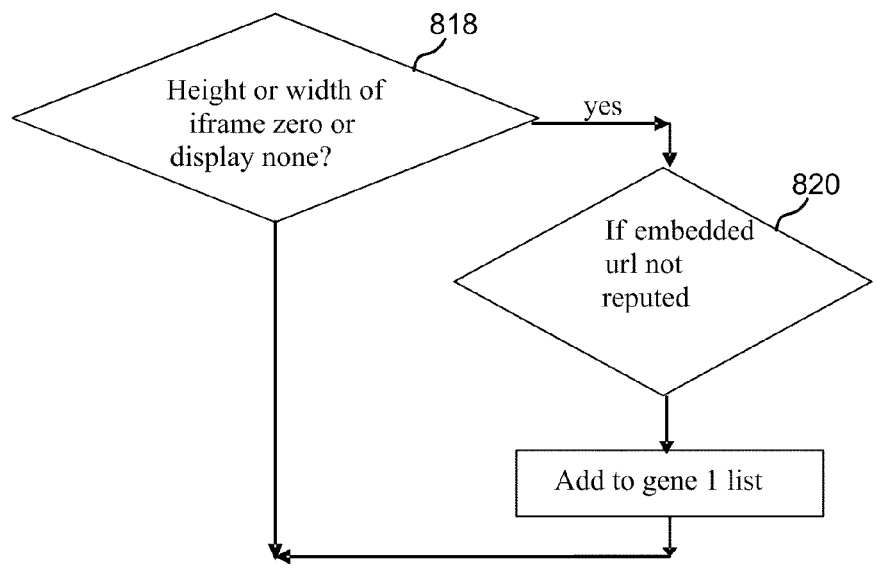

Turning to FIG. 8D, it is a flowchart depicting steps traversed (e.g., by the analysis component 334) in connection with an analysis of whether the data includes a hidden Iframe. As shown, if the height or width of an Iframe is zero, or the display is "none," (Block 818) and an embedded URL is not a reputed URL (Block 820) (e.g., the URL is in the list of suspect URLs in the datastore 338), then an indication of a match is added to the gene-1 list. In many embodiments, the interpretation component 332, 532 provides information about any Iframe (e.g., the height and/or width) and information about any embedded URL to the analysis portion 334 which assess whether the height or width is zero and whether an embedded URL is a suspect URL.

Figure 8E:
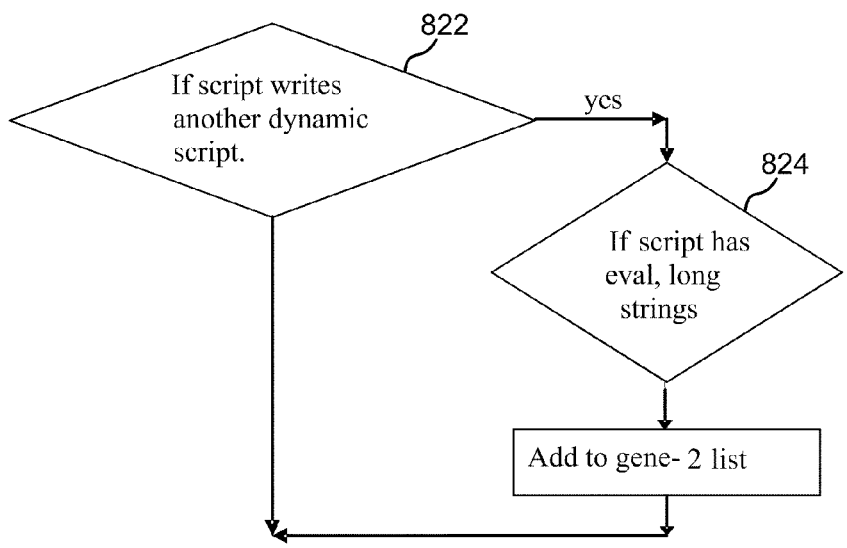

Referring next to FIG. 8E, shown is a flowchart depicted steps traversed in connection with a recursive script analysis. As shown, if a script that is being analyzed (e.g., pseudo executed by the interpretation component 332) writes a dynamic script (Block 822) and includes an Eval function and/or long strings of code, then an indication of a match is added to the gene-2 list.

Figure 8F:
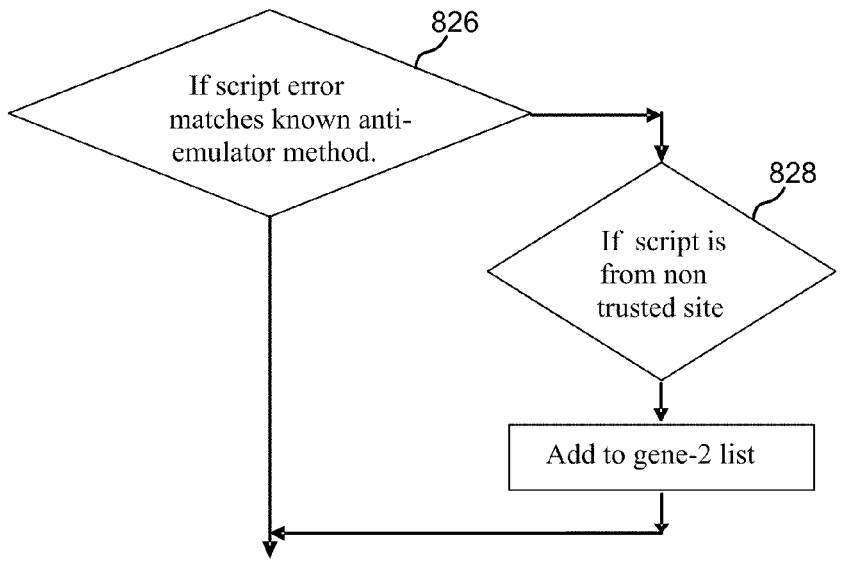

Turning to FIG. 8F, it is a flowchart depicting steps carried out in connection with a script execution error analysis. As depicted, if there is a script error that matches a known anti-emulator method (e.g., while pseudo execution is being carried out by the interpretation component 332) (Block 826) and if the script is from a non-trusted site (e.g., the URL for the source of the site is listed in the suspect URLs in the datastore 338) (Block 828), then an indication of a match is added to the gene-2 list.

Figure 8G:
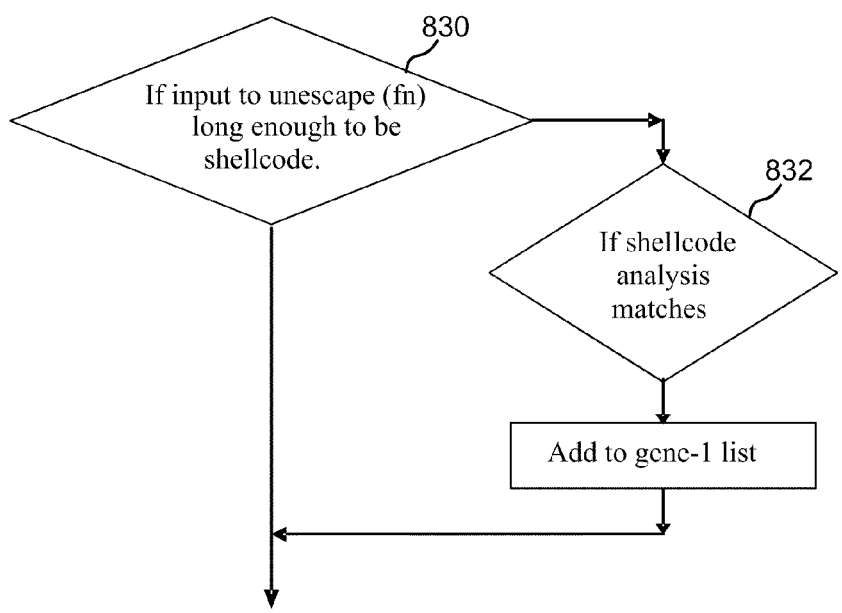

Referring next to FIG. 8G, shown is a flowchart depicted steps traversed in connection with a Unescape input analysis. As shown, if an input to a Unescape function is long enough to be shellcode (Block 830) and if an analysis of the string (e.g., carried out by the shellcode analysis component 118, 618) indicates that the string includes shellcode (Block 832), then an indication of a match is added to the gene-1 list.

Figure 9:
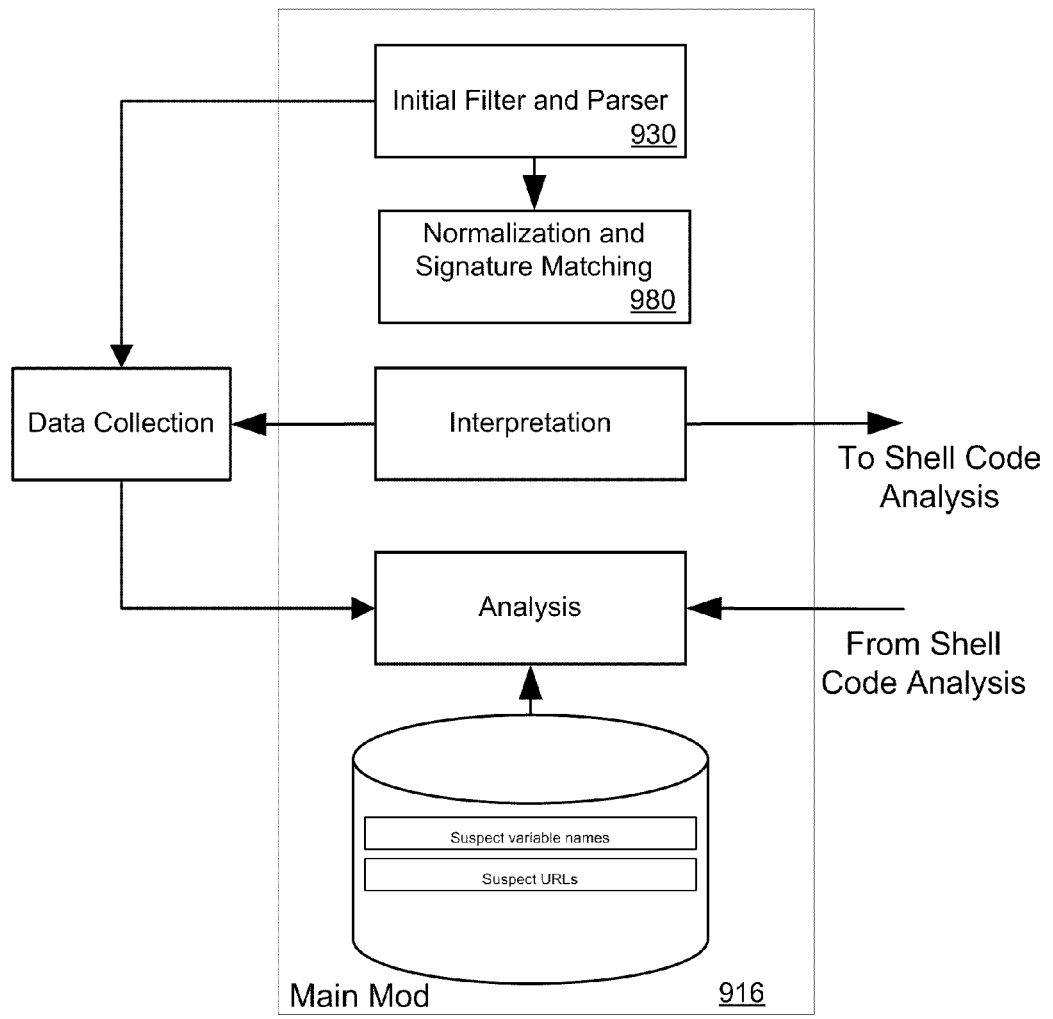
FIG. 9 is a block diagram depicting another exemplary embodiment of the main module of the threat protection portion described with reference to FIG. 1.

Referring next to FIG. 9, shown is a main module 916, which is a variation of the main module 316 described with reference to FIG. 3. As shown, the main module 916 in this embodiment includes a normalization and signature matching component 980 that is generally configured to enable a parse-tree structure of a suspected scripting-language exploit to be compared to parse-tree structure signatures of known scripting-language exploits. In addition, as discussed further herein, the initial filter and parser component 930 in this embodiment is configured to generate a parse-tree that is made available to the normalization and signature matching component 980. Although not required, in the exemplary embodiment depicted in FIG. 9, the normalization and signature matching component 980 works in connection with the components and methodologies (e.g., heuristics based methodologies) described with reference to FIGS. 1-8 so as to augment the protection provided by those methodologies.

Figure 10:
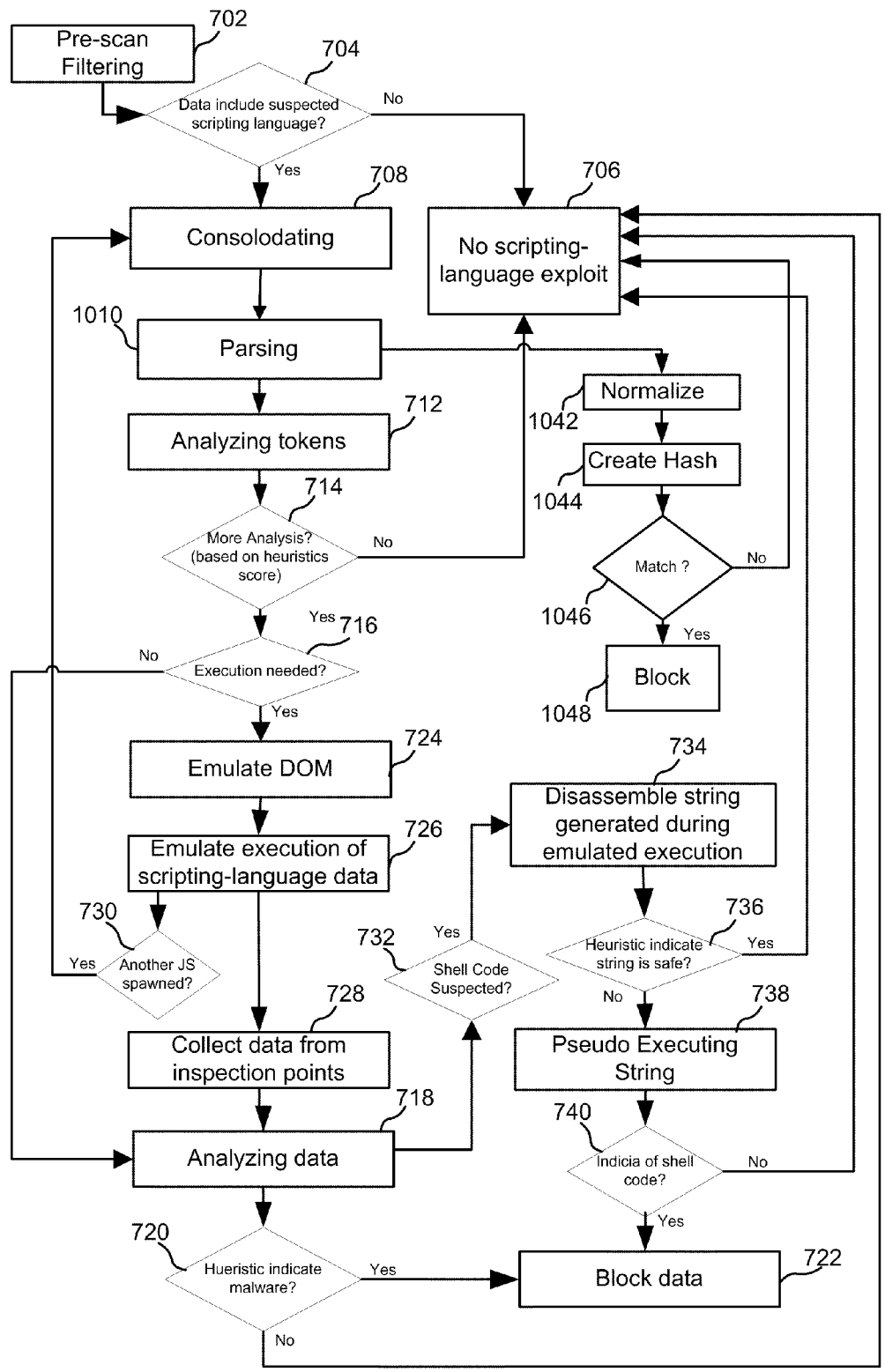
FIG. 10 is a flowchart depicting steps of a method that are traversed in connection with some embodiments of the present invention.

Referring to FIG. 10, for example, shown is a flowchart depicting the same methodologies described with reference to FIG. 7, but in addition to (e.g., in parallel with) steps described with reference to Blocks 712-740, once a suspected scripting-language exploit is parsed 1010 to create a parse-tree, components (e.g., strings and variable names) of the parse-tree are normalized (Block 1042) and a hash function of one or more aspects of the parse-tree (including one or more of the normalized components) is created (Block 1044). And the hash function that is created is compared to hash functions (also referred to herein as signatures) of aspects of parse-tree structures that are known to be scripting-language exploits.

As shown in FIG. 10, if the hash created from a suspected scripting-language exploit (Block 1044) matches a signature of a known scripting language exploit (Block 1046), then execution of the suspected scripting-language exploit is blocked (Block 1048), but if the created hash does not match a signature of a known scripting-language exploit (Block 1046), a determination may be made that the suspected scripting-language exploit is not a scripting language exploit 706.

Although the steps described with reference to Blocks 1042 and 1048 are shown in FIG. 10 as being carried out in parallel with steps described with reference to Blocks 712-740, in alternate modes of operation, the steps described with reference to Blocks 1042 and 1048 may follow steps described with reference to Blocks 712-740. For example, the steps described with reference to Blocks 1042 and 1048 may be carried out only after other steps described with reference to Blocks 712-740 have been unable to determine that the suspected scripting language exploit is safe to execute.

Figure 11:
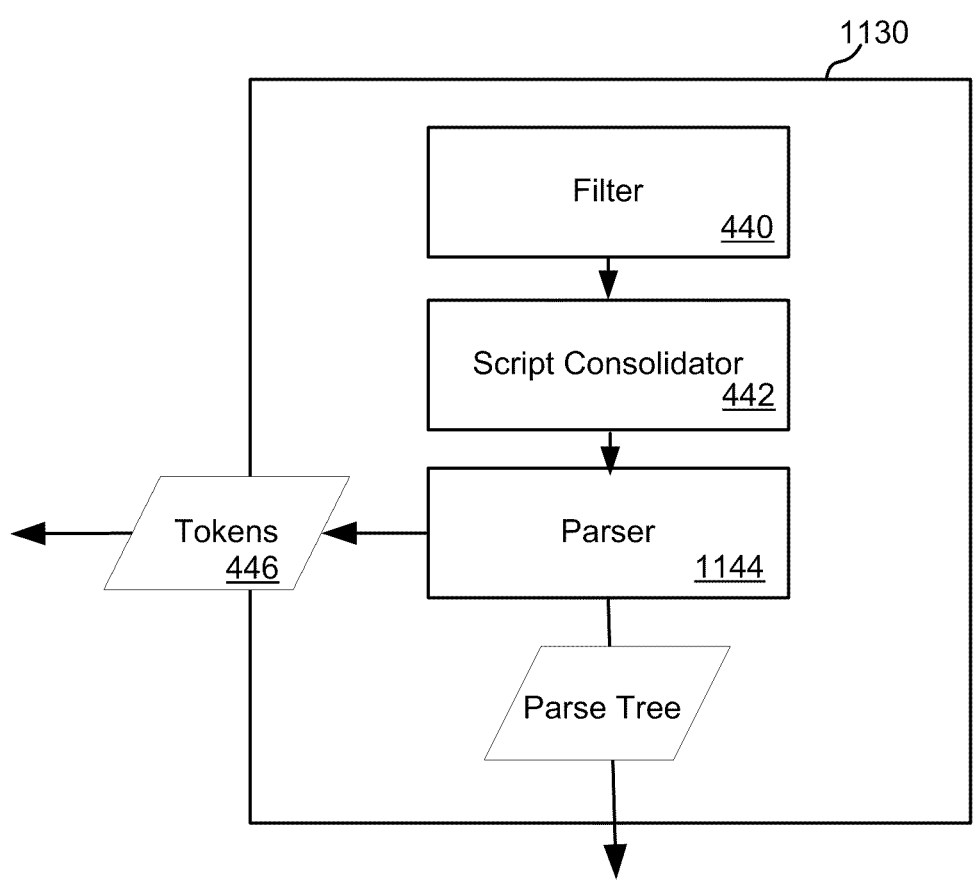
FIG. 11 is a block diagram depicting an exemplary embodiment of the initial filter and parser component described with reference to FIG. 9.

Referring next to FIG. 11, shown is an exemplary embodiment of the initial filter and parser component 930 described with reference to FIG. 9. As depicted, the initial filter and parser component 1130 in this embodiment includes the filter 440 and the script consolidator 442 described with reference to FIG. 4, but in this embodiment a parser 1144 provides tokens 446 (e.g., for further assessment by the analysis portion 334 described with reference to FIG. 3) and also provides a parse tree that is provided to the normalization and signature matching component 980 depicted in FIG. 9.

In many implementations, extraction of script elements (e.g., all script elements) from html pages is a valuable initial step (e.g., prior to parsing) to the techniques described herein. Many malware pages keep key script elements in non obvious places to evade detection. As a consequence, in many embodiments, the initial filter parser 330, 930 extracts script elements from all event handlers supported by the browser. One common scenario for hiding scripts includes a large function parameter to an event handler using onload, for example:

```
<body onload="JavaScript: return
tryMe(
'\x36\x4a\x5d\x4e\x1c\x51\x51\x1c\x01\x1c\x52\x59\x4b\x1c\x7d\x4e\
x4e\x5d\x45\x14\x15\x07\x36\x4a\x5d\x4e\x1c\x51\x59\x51\x63\x5a\x
50\x5d\x5b\x1c\x01\x1c\x0c\x07\x36\x36\x5a\x49\x52\x5f\x48\x55\x5
3\x52\x1c\x54\x14\x15\x1c\x47\x51\x51\x01\x51\x51\x07\x1c\x4f\x59\
x48\x68\x55\x51\x59\x53\x49\x48\x14\x1e\x54\x14\x15\x1e\x10\x1c\
x0e\x0c\x0c\x0c\x15\x07\x41\x36\x36\x5a\x49\x52\x5f\x48\x55\x53\x
52\x1c\x5b\x59\x48\x5e\x14\x5e\x10\x1c\x5e\x6f\x55\x46\x59\x15\x3
6\x47\x4b\x54\x55\x50\x59\x1c\x14\x5e\x12\x50\x59\x52\x5b\x48\x54
\x16\x0e\x00\x5e\x6f\x55\x46\x59\x15\x47\x5e\x1c\x17\x01\x1c\x5e\x
07\x41\x36\x5e\x1c\x01\x1c\x5e\x12\x4f\x49\x5e\x4f\x48\x4e\x55\x5
2\x5b\x14\x0c\x10\x5e\x6f\x55\x46\x59\x13\x0e\x15\x07\x4e\x59\x48\
x49\x4e\x52\x1c\x5e\x07\x41\x36\x36\x5a\x49\x52\x5f\x48\x55\x53\x
52\x1c\x5f\x5a\x14\x15\x36\x47\x4a\x5d\x4e\x1c\x46\x5f\x1c\x01\x1c
\x0c\x44\x0c\x5f\x0c\x5f\x0c\x5f\x0c\x5f\x07\x36\x4a\x5d\x4e\x1c\x5
d\x1c\x01\x1c\x49\x52\x59\x4f\x5f\x5d\x4c\x59\x14\x1e\x19\x49\x08\
x0f\x08\x0f\x19\x49\x08\x0f\x08\x0f\x19\x49\x0c\x5a\x59\x5e\x19\x4
9\x0f\x0f\x09\x5e\x19\x49\x0a\x0a\x5f\x05\x19\x49\x04\x0c\x5e\x05\x
19\x49\x04\x0c\x0c\x0d\x19\x49\x59\x5a\x0f\x0f\x1e\x1c\x17\x36\x1e
\x19\x49\x59\x0e\x08\x0f\x19\x49\x59\x5e\x5a\x5d\x19\x49\x59\x04\x
0c\x09\x19\x49\x5a\x5a\x59\x5f\x19\x49\x5a\x5a\x5a\x5a\x19\x49\x0
4\x5e\x0b\x5a\x19\x49\x58\x5a\x08\x59\x19\x49\x59\x5a\x59\x5a\x19\
x49\x0a\x08\x59\x5a\x19\x49\x59\x0f\x5d\x5a\x19\x49\x05\x5a\x0a\x
08\x19\x49\x08\x0e\x5a\x0f\x19\x49\x05\x5a\x0a\x08\x19\x49\x0a\x5
9\x59\x0b\x19\x49\x59\x5a\x0c\x0f );">
```

Another common scenario for hiding scripts includes adding a script tag outside the html tags to evade html parser libraries. As a consequence, embodiments of the initial filter and parser 330, 930 locate scripts outside of the html tags. An example of a script tag being hidden outside of an html tag is as follows:

```
<SCRIPT>window.onerror=function( ) {return true;}</SCRIPT>
<html>
<object classid='clsid:F0E42D50-368C-11D0-AD81-00A0C90DC8D9'
id='obj'></object>
</html>
<script language='javascript'>
eval(function(p,a,c,k,e,d){e=function(c){return
```

-continued

```
c.toString(36)};if(!''.replace(/ /,String)){while(c--
){d[c.toString(a)]=k[c]||c.toString(a)}k=[function(e){return
d[e]}];e=function( ){return'\\w+'};c=1};while(c--){if(k[c]){p=
p.replace(new
RegExp('\\b'+e(c)+'\\b','g'),k[c])}}return p}('1 2=\'d://a.c.9.8/5.3\';1 4=
\'6://7 b o/1 e/nk/j/f/g.3\';0.h=2;0.i=4;0.m( );',25,25,'obj|var|buf1|exe|
buf2|x|C|Documents|154|57|125|and|68|http|Users|Startup|Thunder|
SnapshotPath|CompressedPath|Programs|Menu|All|PrintSnapshot|
Start|Settings'.split('|'),0,{}))
</script>
```

Figure 12:
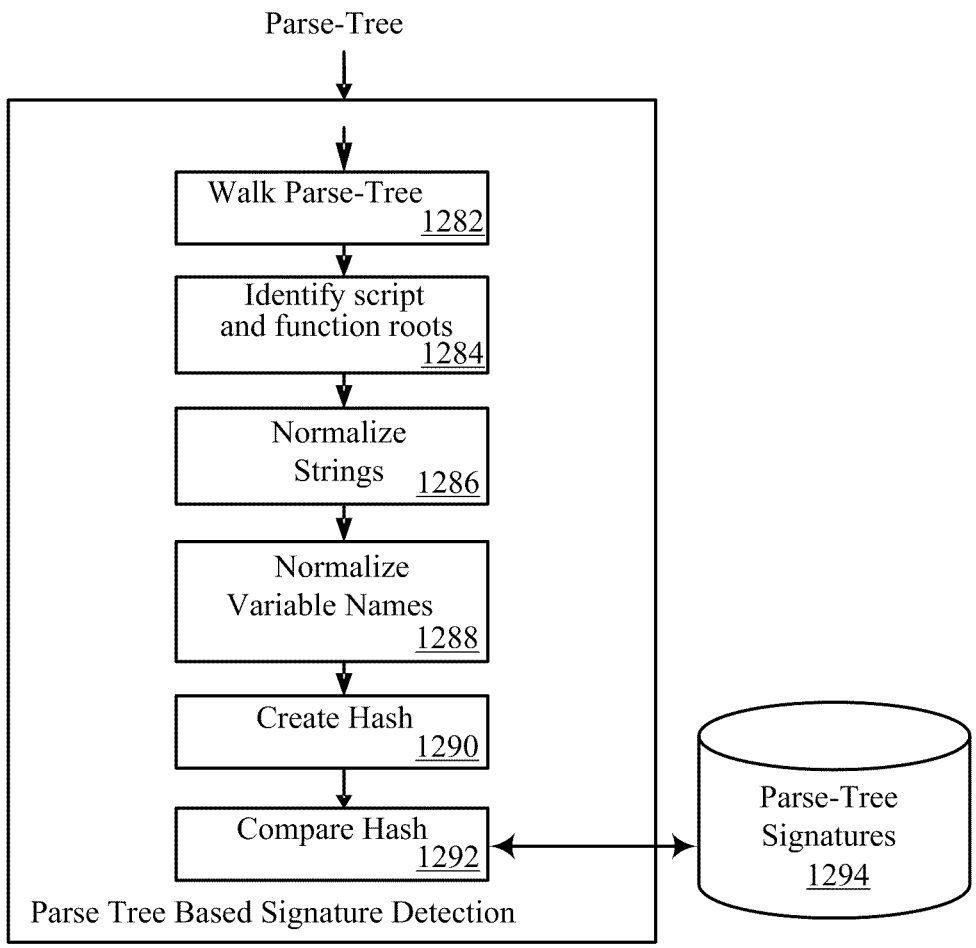
FIG. 12 is a block diagram depicting a process flow that may be carried out by the normalization and signature matching component described with reference to FIG. 9.

Referring next to FIG. 12, shown is a block diagram depicting process flow of an exemplary method for parse-tree based signature detection that may be carried out by the normalization and signature matching component 980 described with reference to FIG. 9. Applicant has found that parsing of scripting-language (e.g., JavaScript) may be a very fast process, and in many instances, using the parse-tree structures for signature matching results in better quality detections in a shorter time period. Most scripting-language exploits serve polymorphic scripts which use different variable names on each invocation to defeat signatures. They also use a set of string splitting techniques to randomize the output. As a consequence, many embodiments of the present invention reduce the parse tree by normalizing variable names to a set convention and normalize string splitting techniques. A signature database 1294 tuned to parse-tree structure is then applied to detect the malware.

More specifically, as shown in FIG. 12, a parse-tree (e.g., provided by parser 1144) is walked (Block 1282), and script and function roots of the parse-tree are identified and saved in an index list (Block 1284). In addition, the strings are normalized to reduce the parse tree (Block 1286). For example, the parse tree is traversed and common string splitting constructs are normalized. Sophisticated JavaScript parsers are leveraging string normalization, such as concatenation of simple split strings. But extending this concept helps to improve signature matching. For example, the following is normalized by most parsers:

```
p"+"arseIn"+"t(do"+"cument."+"getEle"+"ment"+"ById("+"'jq2D"+
"p').inne"+"rHTML"+")
normalizes to
parseInt(document.getElementById('jq2Dp').innerHTML)
```

But embodiments of the present invention process complex cases with additional parse tree processing. For example, the following string:

```
document['UHUmehUZwUHUmehUZrUHUmehUZiUHUmehUZt
UHUmehUZeUHUmehUZ'.replace(/UHUmehUZ/g,'')]
normalizes to
document[write]
```

And as another example, the following string:

```
UrH8GM5w7v=['K','P','e','P','Q','1','9','j','v','d','Y','a','b','7','w','V','J',
'I','s','z','j'];Lu0MZARnv3=UrH8GM5w7v[2]+UrH8GM5w7v[8]+
UrH8GM5w7v[11]+UrH8GM5w7v[17];
normalizes to
MZARnv3 = "eval";
```

As shown in FIG. 12, variable names of the parse tree are also normalized (Block 1288). For example, the parse tree is traversed and all variable names are translated using a set convention. A white list may be looked up to leave any standard object names (e.g., JavaScript standard object names) alone. In addition, a hash of the parsed output token list that is dumped from the parse tree is created (Block 1290), and the hash is then compared against the signature database 1294 for any matches (Block 1292). Signatures can be classified based on the type of element they target like variable names, strings, integers etc. These along with primary/secondary relationship chains help reduce the number of checks applied to a script.

Many exploit kits serve code that uses different variable names on each invocation, and as a consequence, replacing variable names with a standard convention and creating sectional hashes for script and function roots, as discussed above, provides effective detection mechanism for many exploit kits.

Sandboxing (e.g., JavaScript sandboxing) continues to be an expensive performance challenge. Many embodiments of the present invention eliminate the majority of the genuine code and narrow the list to a small target for execution. The approach used to shorten the list also depends on the processing power of the sandbox system. The following patterns may be considered to separate the code:

High density code—Malicious scripts are typically served in a very compact form with high length to scripting-language separator ratios.

Presence of large string constant—Shellcodes, redirects etc. are typically stored in large encoded strings and are a good criteria.

Large encoded data passed in as parameter to function—Sometimes the encoded data is passed in from a handler like Onload.

Dynamic script writes—Check for certain types of dynamic scripts written using document.write family of functions.

Presence of eval—Eval is a key element for most malicious scripts.

Techniques for Implementing the Sandbox

A document object model (DOM) that uses simple DOM objects that fake data are not very effective to deobfuscate today's mainstream malicious scripts. The following facilitates and understanding of the level of DOM required for effectively uncompressing these scripts without error.

Use of HTML Elements During Decryption

Many popular exploit kits use constructs like the following in the decryptor to check valid DOM data.

```
document.write('<p>3379</p>');
var bogqi8 = parseInt( document. getElementsByTagName('p') [0].
innerHTML);
```

Use of Http Headers Through DOM

Requiring headers like last-modified field for successful deobfuscation is found in toolkits like Fragus that makes analysis with simulated data infeasible. Any effective scripting language sandbox is expected to have access to http header info.

Use of Served Location Through DOM

Another technique seen is the use of the serving URL as a key to a scripting language (e.g., JavaScript). A good example is the JS_VIRTOOL solution.

Function Redefinitions

A typical technique applied by analysis engines is to replace interesting functions like eval to common debugging functions like print. Outputs from these functions provide significantly less complex code for analysis. In most cases it might render the JavaScript code completely decrypted. JavaScript allows for redefinition of functions within the script body. Many malicious scripts redefine debugging functions like print to local script functions as an anti analysis technique. The alert in the code below results in exiting the script.

```
<script>
    var str="alpanert";
    var str2=str.replace("pan","");
    str2 = quit;
    alert(str2);
</script>
```

Deliberate Syntax Errors

Web browsers are very resilient to script errors but most of the analysis engines embedding JavaScript interpreters are not. Malicious scripts take advantage of this behavior and introduce syntax errors which will break these sandboxes. For example,

```
<script>
    a && bi; function asd2 ( ) {alert("two");}
</script>
<script>
    asd = asd2; asd( );
</script>
```

DOM Cross Checks

The following are some of the defensive checks used to test real browsers.
  Check for window.document=document. Document object can be referenced via Window object in a full DOM implementation. That is not the case with most JavaScript analyzers.
  document.location=location. Location object can be referenced via the document object in a browser but not in most skeleton DOM implementations.
  Another one is self reference. window.self=window in a browser.
  Property persistence checks and intrinsic default property values are other methods many scripts use to determine if it is a real browser.
  Global variable relationships to window object check. var foo="hacked"; if (window.foo=="hacked") malicious stuff . . . ;
Component Access Checks Some form of data retrieval in the early part of the script before proceeding with execution is an effective way to identify simulated environments like JavaScript analyzers. The following code tries to retrieve real player version before proceeding with execution.

```
VulObject = "IER" + "PCtl.I" + "ERP" + "Ctl.1";
try
{
    Real = new ActiveXObject(VulObject);
}catch(error){ return;}
RealVersion = Real.PlayerProperty("PRODUCTVERSION");
```

Many implementations of a JavaScript sandbox include:
  A custom wrapper for functions like eval to log data.
  Implementing window, document, navigator, location and screen objects.
  Populating these objects with real data from the http/html response
  Supporting both get and set for properties.
Identifying Differences Between Scripting-Language Engine and the Target The parsing and compilation optimizations done by some JavaScript engines have side effects on script behavior in certain scenarios. Malware scripts take advantage of these differences not to deobfuscate other than in the targeted browser. One classic example is arguments.callee.toString( ).

The following script displays 87 in firefox whereas IE displays 75.

```
<script type="text/javascript">
    function testfunc( ){var vl = arguments.callee.toString( ).length;alert(vl);}
    testfunc( );
</script>
```

Limiting Execution Times

Most JavaScript engines provide mechanisms for hooking periodic events during execution. In many implementations, theses events are taken advantage of, and an execution timeout mechanism is implemented. It is not uncommon to find scripts that execute in an infinite loop or run for a long time.
Collect of Data for Post Processing The most common points for collecting data from a JavaScript sandbox are the input to hooked functions like eval, document.write, document.writeln, document.CreateObject, unescape and any string output of the script execution itself. Another useful technique is inspecting variable values at the end of execution and collecting suspicious long strings for match against shellcode and exploit signatures.

It is very common to find obfuscated scripts writing back dynamic scripts using document.write/writeln functions as in the following snippet.

```
document.writeln("<SCRIPT language=\"JavaScript\">");
document.writeln("vargoodflow = \"%u9090%u6090\" +");
document.writeln("\"%u17eb%u645e%u30a1%u0000\" +");
document.writeln("\"%u0500%u0800%u0000%uf88b%u00b9%u0004%uf300%uffa4%ue8e0\" +");
document.writeln("\"%uffe4%uffff%ua164%u0030%u0000%u408b%u8b0c%u1c70%u8bad\" +");
document.writeln("\"%u0870%uec81%u0200%u0000%uec8b%ue8bb%u020f%u8b00%u8503\" +"); . . .
```

In many embodiments, these scripts are extracted and added to an input queue for parsing, signature matching and possible execution.

Document.write constructs are also heavily used to write dynamic iframes that loads an exploit URL from a malicious site. Most legitimate sites infected with an exploit kit have such iframes injected into their pages. Extracting urls from such iframes and checking against a url blacklist/reputation score is needed to identify infected pages.

Output from eval function hook is typically a complete unobfuscated script. This may be fed back into the system to parse, signature match and possible another level of execution.

Createobject output is useful in identifying many of the exploit kits which try to access multiple unrelated activex objects one after the other.

Data from Unescape function is very valuable in matching shellcode, nop sleds and exploit address signatures.

Heuristics

As described herein, a variety of heuristic techniques can be applied to the sandbox output to aid detection.

One useful form of heuristics is shellcode analysis on long strings like hex and Unicode encoded strings. This tends to be performance intensive so doing these selectively and after other checks is preferred. The process involves disassembling every byte and tracking execution in a very light weight way to identify attempts to load system dlls or self modifying code that is trying to decrypt itself.

Many exploit authors use offensive keywords for variable names like kill, exploit etc.

Attempt to access favorites, clipboard etc without user prompt.

Presence of recursive obfuscated scripts combined with site reputation.

Attempt to access a number of unrelated activex objects.

Filesystem/Registry access attempts to critical system areas. Unfortunately this is hard to track because legitimate scripts also conduct this operation.

In many instances it is also valuable to have a target url based white listing infrastructure in place for potential, but rare false positives.

In conclusion, embodiments of the present invention utilize one or more combinations of parse-tree structure signature matching, prescan filters, a scripting language parser, an execution emulator, a DOM emulator, shellcode identification and a set of heuristics to identify scripting-language exploits (e.g., custom encoded scripting language) exploits. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method for protecting client computers, comprising:
receiving webpage data at a proxy from a webpage before the data reaches
an intended recipient, wherein the proxy is disposed as an intermediary between a server serving up the webpage and the intended recipient;
gathering scripting-language-data from the webpage data;
identifying characteristics of the scripting-language-data;
scoring the characteristics of the scripting-language-data based upon a likelihood that the characteristics of the scripting-language-data are associated with malicious scripting-language-data;
generating a parse tree from the gathered scripting-language-data;
normalizing string-splitting constructs to reduce a level of string splitting in the parse tree;
replacing variable names of the parse tree with standard names;
generating a representation of at least a portion of the standard names;
comparing the representation with signatures of known scripting language exploits; and
determining whether to prevent the scripting-language-data from reaching the intended recipient based upon one or more of:
(i) a score of characteristics of a normalized scripting-language-data;
(ii) a score of characteristics of inspection data based on the scripting-language-data; and
(iii) when the representation matches a signature of the one of the known scripting language exploits.

2. The method of claim 1, wherein the representation is a hash of at least a portion of the standard names.

3. The method of claim 1, including:
disassembling a string that is generated from the scripting-language-data;
pseudo-executing the disassembled string; and
determining whether the scripting-language-data includes shellcode.

4. The method of claim 3, wherein the disassembling is responsive to a size of the string exceeding a threshold.

5. The method of claim 1, wherein identifying characteristics of the normalized scripting language-data includes identifying a presence of Eval functions, identifying statements exceeding a threshold-string-size, and identifying the existence of a DOM object, and wherein the inspection-data collected from the inspection points includes an indication whether a hidden Iframe is present, an indication whether a script writes another dynamic script, and an indication whether a script error matches a known anti-emulator method.

6. The method of claim 1, wherein the normalized scripting-language-data comprises consolidated portions of scripting-language-data that are normalized into tokens; and
wherein the inspection data is collected during the emulated execution of data suspected of being scripting-language-based.

7. The method of claim 6, wherein the normalized scripting-language-data indicates functions that the scripting-language-data would execute when executed in a web browser.

8. A system executed by a processor for protecting client computers; comprising:
an initial filter that gathers scripting-language-data from webpage data;
a signature database of signatures of known scripting-language-data exploits;
a parser that generates a parse tree from the scripting-language-data;
a normalization and signature matching component that reduces a complexity of the parse tree, generates a representation of at least a portion of a structure of the parse tree, and prevents the scripting-language-data from reaching an intended recipient when the representation matches one of the signatures of known scripting-language-data exploits; and
an analysis component that identifies characteristics of the scripting-language-data, scores the characteristics of scripting-language-data based upon a likelihood that the characteristics of the scripting-language-data are associated with malicious scripting-language data, and determines whether to block the scripting-language-data from reaching the intended recipient based upon a score of characteristics of a normalized scripting-language-data and a score of characteristics of inspection data based on the scripting language-data.

9. The system of claim 8, wherein the normalization and signature matching component generates a hash representation of at least a portion of the structure of the parse tree.

10. The system of claim 8, including:
a shellcode module that disassembles one or more strings that are generated during an emulated execution of the scripting-language-data so as to generate disassembled code and pseudo-executes at least a portion of the disassembled code to determine whether to block the scripting-language-data from reaching the intended recipient based upon pseudo-execution-data.

11. The system of claim 8, wherein the shellcode module does not disassemble the one or more strings unless the one or mores strings exceeds a size threshold.

12. The system of claim 8, wherein the normalized scripting-language-data comprises consolidated portions of scripting-language-data that are normalized into tokens; and
wherein the inspection data is collected during the emulated execution of data suspected of being scripting-language-based.

13. The system of claim 12, wherein the normalized scripting-language-data indicates functions that the scripting-language-data would execute when executed in a web browser.

14. A non-transitory, tangible computer readable storage medium, encoded with processor readable instructions to perform a method for protecting client computers, the method comprising:
receiving webpage data at a proxy from a webpage before the data reaches an intended recipient, wherein the proxy is disposed as an intermediary between a server serving up the webpage and the intended recipient;
gathering scripting-language-data from the webpage data;
generating a parse tree from the gathered scripting-language-data;
identifying characteristics of the scripting-language-data;
scoring the characteristics of the scripting-language-data based upon a likelihood that the characteristics of the scripting-language-data are associated with malicious scripting-language-data;
normalizing string-splitting constructs to reduce a level of string splitting in the parse tree;
replacing variable names of the parse tree with standard names;
generating a representation of at least a portion of the standard names;
comparing the representation with signatures of known scripting language exploits; and
determining whether to prevent the scripting-language-data from reaching the intended recipient based upon one or more of:
(i) a score of characteristics of a normalized scripting-language-data;
(ii) a score of characteristics of inspection data based on the scripting-language-data; and
(iii) when the representation matches a signature of the one of the known scripting language exploits.

15. The non-transitory, tangible computer readable storage medium of claim 14, wherein the representation is a hash of at least a portion of the standard names.

16. The non-transitory, tangible computer readable storage medium of claim 14, the method including:
disassembling a string that is generated from the scripting-language-data;
pseudo-executing the disassembled string; and
determining whether the scripting-language-data includes shellcode.

17. The non-transitory, tangible computer readable storage medium of claim 16, wherein the disassembling is responsive to a size of the string exceeding a threshold.

18. The non-transitory, tangible computer readable storage medium of claim 14, wherein identifying characteristics of the normalized scripting-language-data includes identifying a presence of Eval functions, identifying statements exceeding a threshold-string-size, and identifying the existence of a DOM object, and wherein the inspection-data collected from the inspection points includes an indication whether a hidden Iframe is present, an indication whether a script writes another dynamic script, and an indication whether a script error matches a known anti-emulator method.

19. The non-transitory, tangible computer readable storage medium of claim 14, wherein the normalized scripting-language-data comprises consolidated portions of scripting-language-data that are normalized into tokens; and
wherein the inspection data is collected during the emulated execution of data suspected of being scripting-language-based.

20. The non-transitory, tangible computer readable storage medium of claim 19, wherein the normalized scripting-language-data indicates functions that the scripting-language-data would execute when executed in a web browser.

* * * * *